United States Patent
Gelfenbeyn et al.

(10) Patent No.: US 11,355,117 B2
(45) Date of Patent: *Jun. 7, 2022

(54) DIALOG SYSTEM WITH AUTOMATIC REACTIVATION OF SPEECH ACQUIRING MODE

(71) Applicant: Google LLC, Mountain View, CA (US)

(72) Inventors: Ilya Gennadyevich Gelfenbeyn, Sunnyvale, CA (US); Artem Goncharuk, Mountain View, CA (US); Pavel Aleksandrovich Sirotin, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 119 days.

This patent is subject to a terminal disclaimer.

(21) Appl. No.: 16/990,525

(22) Filed: Aug. 11, 2020

(65) Prior Publication Data
US 2020/0372914 A1    Nov. 26, 2020

Related U.S. Application Data

(63) Continuation of application No. 16/137,069, filed on Sep. 20, 2018, now Pat. No. 10,748,537, which is a (Continued)

(30) Foreign Application Priority Data

Nov. 28, 2012 (RU) ................................ 2012150996

(51) Int. Cl.
*G10L 15/22* (2006.01)
*G10L 25/48* (2013.01)
(Continued)

(52) U.S. Cl.
CPC .............. *G10L 15/22* (2013.01); *G06F 3/167* (2013.01); *G06F 16/3329* (2019.01);
(Continued)

(58) Field of Classification Search
CPC ......... G10L 15/00; G10L 15/22; G10L 15/26; G10L 15/30; G10L 15/18
See application file for complete search history.

(56) References Cited

U.S. PATENT DOCUMENTS 6,510,411 B1 * 1/2003 Norton ................ H04M 3/4936
379/76
10,152,975 B2   12/2018 Higbie et al.
(Continued)

*Primary Examiner* — Paras D Shah
(74) *Attorney, Agent, or Firm* — Middleton Reutlinger

(57) ABSTRACT

Embodiments of the disclosure generally relate to a dialog system allowing for automatically reactivating a speech acquiring mode after the dialog system delivers a response to a user request. The reactivation parameters, such as a delay, depend on a number of predetermined factors and conversation scenarios. The embodiments further provide for a method of operating of the dialog system. An exemplary method comprises the steps of: activating a speech acquiring mode, receiving a first input of a user, deactivating the speech acquiring mode, obtaining a first response associated with the first input, delivering the first response to the user, determining that a conversation mode is activated, and, based on the determination, automatically re-activating the speech acquiring mode within a first predetermined time period after delivery of the first response to the user.

14 Claims, 15 Drawing Sheets

Related U.S. Application Data continuation of application No. 15/395,476, filed on Dec. 30, 2016, now Pat. No. 10,102,854, which is a continuation of application No. 15/169,926, filed on Jun. 1, 2016, now Pat. No. 9,570,090, which is a continuation-in-part of application No. 14/721,012, filed on May 26, 2015, now Pat. No. 9,564,149, which is a continuation-in-part of application No. PCT/IB2012/056955, filed on Dec. 4, 2012, said application No. 15/169,926 is a continuation-in-part of application No. 14/721,044, filed on May 26, 2015, now Pat. No. 9,946,511, which is a continuation-in-part of application No. PCT/IB2012/056973, filed on Dec. 5, 2012, said application No. 15/169,926 is a continuation-in-part of application No. 14/775,729, filed as application No. PCT/RU2013/000202 on Mar. 15, 2013, now Pat. No. 9,875,741, said application No. 15/169,926 is a continuation-in-part of application No. 14/901,026, filed as application No. PCT/RU2013/000551 on Jun. 27, 2013, now Pat. No. 10,026,400.

(51) Int. Cl.
| | | |
|---|---|---|
| *G10L 15/08* | (2006.01) | |
| *G10L 15/18* | (2013.01) | |
| *G10L 15/26* | (2006.01) | |
| *G06F 16/332* | (2019.01) | |
| *G06F 3/16* | (2006.01) | |
| *G10L 15/30* | (2013.01) | |

(52) U.S. Cl.
CPC ........ *G10L 15/083* (2013.01); *G10L 15/1815* (2013.01); *G10L 15/1822* (2013.01); *G10L 15/26* (2013.01); *G10L 15/30* (2013.01); *G10L 25/48* (2013.01); *G10L 15/18* (2013.01); *G10L 2015/223* (2013.01); *G10L 2015/228* (2013.01)

(56) References Cited

U.S. PATENT DOCUMENTS

| | | | |
|---|---|---|---|
| 2005/0248574 A1 | 11/2005 | Ashtekar et al. | |
| 2009/0054768 A1* | 2/2009 | Halmann | A61B 8/00 600/437 |
| 2010/0076753 A1* | 3/2010 | Doi | G10L 15/22 704/201 |
| 2011/0208330 A1* | 8/2011 | Oomae | G11B 20/10527 700/94 |
| 2011/0231433 A1 | 9/2011 | Tabata et al. | |
| 2014/0334645 A1 | 11/2014 | Yun et al. | |
| 2015/0223110 A1 | 8/2015 | Lindner et al. | |
| 2015/0325243 A1* | 11/2015 | Grant | G10L 19/002 704/229 |

* cited by examiner

DIALOG SYSTEM WITH AUTOMATIC REACTIVATION OF SPEECH ACQUIRING MODE

TECHNICAL FIELD

This disclosure relates generally to dialog systems, conversational agents and chat information systems and, more particularly, to dialog systems having the feature of automatic reactivation of speech acquiring mode enabling a user, in certain conversation scenarios, to make an additional request after an answer to a user's previous request is delivered by the dialog system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Today, dialog systems are widely used in the information technology industry, especially as mobile applications for wireless telephones and tablet computers. Generally, a dialog system refers to a computer-based agent having a human-centric interface for accessing, processing, managing, and delivering information. Dialog systems are also known as chat information systems, spoken dialog systems, conversational agents, chatter robots, chatterbots, chatbots, chat agents, digital personal assistants, and automated online assistants, to name a few. All these terms are within the scope of the present disclosure and referred to as a "dialog system" for simplicity.

Traditionally, a dialog system interacts with its users in natural language to simulate an intelligent conversation and provide personalized assistance to the users. For example, a user may generate requests to the dialog system in the form of conversational questions, such as "Where is the nearest hotel?" or "What is the weather like in Arlington?", and receive corresponding answers from the dialog system in the form of an audio and/or displayable message. The users may also provide voice commands to the dialog system so as to perform certain functions including, for example, generating e-mails, making phone calls, searching particular information, acquiring data, navigating, providing notifications and reminders, and so forth. Thus, dialog systems are now very popular and are of great help, especially for holders of portable electronic devices such as smart phones, cellular phones, tablet computers, gaming consoles, and the like.

Historically, dialog systems, and especially spoken dialog systems, require a user to activate a dialog system before he makes a request. It is obvious that otherwise dialog systems acquire all spoken words made by the user, which will lead to the dialog system overloading, excessive use of computing resources, inaccuracy of dialog system responses, and so forth. Accordingly, users need to manually activate dialog systems every time they want to make a request. This may be very annoying and inconvenient for the users. Additionally, the need for manual reactivation of dialog systems does not allow the dialog systems to be user friendly and keep human-like speech conversations, which significantly limits their application.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure relates to embodiments of a dialog system and a method of its operation, which overcome at least some drawbacks of prior art systems. In particular, the embodiments provide for a speech acquiring mode for a dialog system that can be manually activated/deactivated and automatically activated/deactivated. The embodiments provide for a feature allowing for automatically reactivating the speech acquiring mode after the dialog system has delivered a response to a user request. The reactivation is intelligent in terms of its dependence from a number of predetermined criteria, rules, and/or conversation scenarios. In some conversation scenarios, the reactivation is performed with a delay, which may depend on a number of factors. In other conversation scenarios, the reactivation is intentionally suppressed based upon a type of a request or response delivered by the dialog system. It yet other conversation scenarios, the reactivation can last for a predetermined period of time, which may be also intelligently selected based on a number of factors. These and other embodiments are further summarized in the following aspects of the present disclosure. These aspects, however, are not intended to limit the scope of the subject matter.

According to an aspect of the embodiments of present disclosure, a method is provided for operating of a dialog system. The method can be implemented by means of a computing device having one or more processors and a memory in association with the one or more processors. The method comprises the steps of activating a speech acquiring mode, receiving a first input of a user, deactivating the speech acquiring mode, obtaining a first response associated with the first input, delivering the first response to the user, determining that a conversation mode is activated, and, based on the determination, automatically re-activating the speech acquiring mode within a first predetermined time period after delivering of the first response to the user.

In certain embodiments, the first input of the user may comprise a speech-based input. The first input of the user may also comprise a text-based input. In certain embodiments, the method may further comprise the steps of receiving a second input of the user, obtaining a second response associated with the second input, and delivering the second response to the user. Further, the method may comprise the step of deactivating the speech acquiring mode after receiving of the second input of the user based on an instruction from a remote server or a type of response.

In certain embodiments, the method may further comprise the steps of determining that a voice activation mode is deactivated and, based on the determination that that the voice activation mode is deactivated, the step of delivering the first response to the user may comprise displaying a displayable message associated with the first response to the user.

In yet more embodiments, the conversation mode may enable the computing device to record the first input of the user. The conversation mode may also enable the computing device to recognize the first input of the user. The conversation mode may also enable the computing device to transmit the first input of the user to a remote server.

In certain embodiments, the method may further comprise the steps of recognizing the first input of the user to generate a first recognized input and generating the first response to the recognized input. In certain embodiments, the method may further comprise the step of selecting the first predetermined time period depending on a type of the first input of the user. In certain embodiments, the method may further comprise the step of selecting the first predetermined time period depending on a type of the first response. In certain embodiments, the method may further comprise the step of selecting the first predetermined time period depending on a length of the first response. The first predetermined time period can be fixed between 1 and 10 seconds.

In certain embodiments, the method may further comprise the steps of setting an automatic recognition flag to the first response based on a type of the first response or a type of the first input and suppressing the speech acquiring mode based on the automatic recognition flag. The first response may comprise metadata, which set the first predetermined time period. The speech acquiring mode can be re-activated for a second predetermined time period. In yet more embodiments, the first response may comprise metadata, which may set the second time period. The step of activating of the speech acquiring mode may be performed in response to determining an activation of an actionable button by the user.

According to another aspect of the embodiments of the present disclosure, a dialog system is provided. The dialog system may comprise a speech recognition module configured to receive a first user input, recognize at least a part of the first user input, and generate a first recognized input, when the speech recognition module is in a speech acquiring mode. The dialog system may further comprise a dialog manager configured to activate and deactivate the speech acquiring mode, and to generate a first response to the first recognized input. The dialog system may comprise a user output module configured to deliver the first response to a user. The dialog manager is further configured to automatically re-activate the speech acquiring mode within a first predetermined time period after delivering of the first response to the user, when a conversation mode is activated.

According to yet another aspect of the embodiments of the present disclosure, a non-transitory processor-readable medium having instructions stored thereon is provided. The instructions, when executed by one or more processors, may cause the one or more processors to implement a method for operating of a dialog system. The method may comprise the steps of activating a speech acquiring mode, receiving a first input of a user, deactivating the speech acquiring mode, obtaining a first response associated with the first input, delivering the first response to the user, determining that a conversation mode is activated, and, based on the determination, automatically re-activating the speech acquiring mode within a first predetermined time period after delivering of the first response to the user.

In further example embodiments and aspects, modules, systems, subsystems, or devices can be adapted to perform the recited method steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

Introduction

As outlined above, embodiments of the present disclosure provide for a dialog system having the feature for intelligent reactivating of a speech acquiring mode depending on a number of factors and conversation scenarios. These embodiments will now be described with reference to figures of the accompanying drawings.

Figure 1:
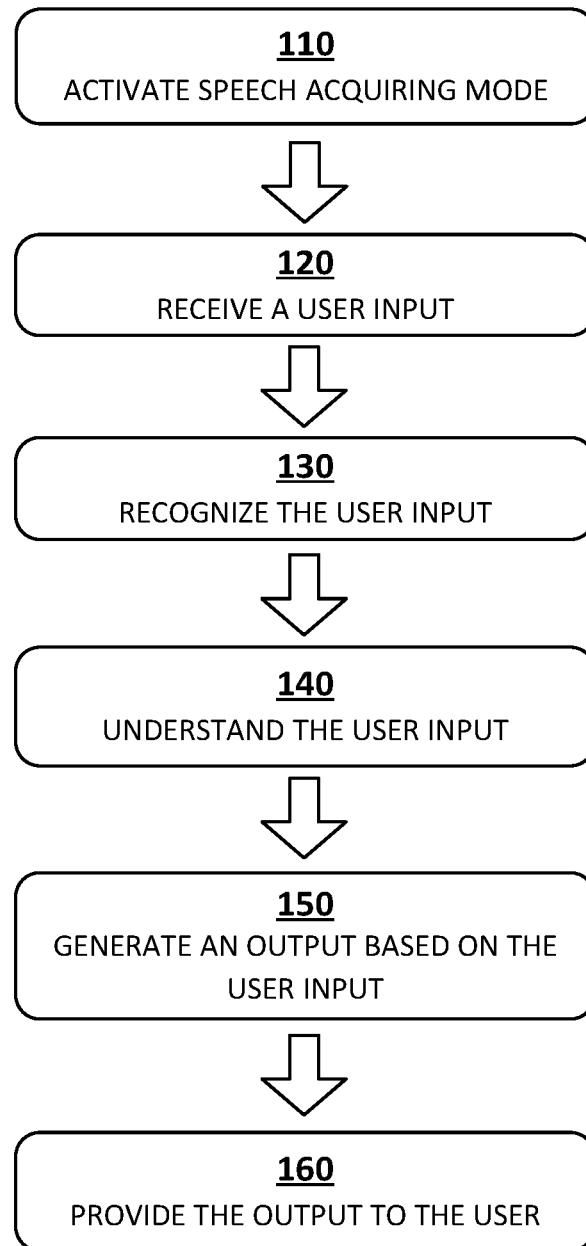
FIG. 1 shows a high-level flow diagram of a general process for user interaction with an exemplary spoken dialog system.

FIG. 1 shows a high-level flow diagram 100 of a general process for user interaction with an exemplary spoken dialog system. In general, the user may interact with the dialog system utilizing a user device selected from a wide range of electronic devices including, for example, a computer (desktop computer, laptop computer, tablet computer), smart phone, cellular phone, game console, game pad, remote controller, television device, smart (Internet) television device, audio system, in-vehicle computer system, infotainment system, or any other suitable electronic device. The interaction with the dialog system may include speech commands, although key input commands, selection of actionable (clickable) messages, or gesture-based commands are also possible. As described below in greater detail, the dialog system may refer to a software mobile application installed on the user device, a server, or a remote device, or it may refer to a distributed application or a cloud-based service.

As shown in FIG. 1, the user may commence interaction with the exemplary spoken dialog system at operation 110 with activating a speech acquiring mode. This mode activates the dialog system to receive user requests such as spoken or typed questions or commands. The speech acquiring mode is typically activated by pressing a dedicated button, which is usually shown as a microphone image. Notably, the speech acquiring mode is activated temporally (e.g., specifically for the time period required to record a user oral request).

Accordingly, at operation 120, the user provides a speech-based (audio) user input (e.g., using one or more microphones). The user input may refer to an information request, such as "What is the weather like today?", or a speech command such as to send a text message or the like. Once the user completes his request or command, the speech acquiring mode is deactivated and the dialog system may start its processing.

At operation 130, an automatic speech recognizer (ASR) of the dialog system may recognize the user input so as to translate spoken words, phrases, and sentences into text, which is referred herein to as a recognized input. The recognized input is then analyzed at operation 140 by a natural language processing (NLP) module (for example, morphological analysis, part-of-speech tagging, or shallow parsing can be performed). The NLP module may also map the recognized input or its parts to one or more meaning representations (e.g., semantic frame) from which the dialog act, user goal, and named entities are extracted by a semantic parser or statistical model.

At operation 150, a dialog manager generates an output (response) based at least in part on the recognized input and located meaning representations. For example, the dialog manager may retrieve specific information from one or more resources (e.g., electronic calendar, database, website, remote or local resources, remote or local services, etc.). At operation 160, the output is provided to the user. Generally, the output can be delivered in the form of text, image, audio, or video message. For these ends, an output renderer may be utilized, which may transform text into speech and provide the output as a machine-generated audio signal. Alternatively, the output may be presented as a text message and shown on a display of the user device.

The process illustrated by diagram 100 can be performed cyclically. More specifically, if the user wants to keep a conversation with the dialog system open and provide an additional request or clarify anything in response to the dialog system output, the speech acquiring mode needs to be re-activated so as to complete the operations 110-160. The embodiments of the present disclosure enable automatically re-activating the speech acquiring mode depending on a number of factors. Among such factors are a type or parameter of first user request, type or parameter of dialog system response, and a conversation scenario, to name a few. Notably, the re-activation can be delayed for a time period after the operation 160 is completed, with the time period being predetermined or intelligently selected based on the above factors or other criteria. Moreover, the speech acquiring mode can be activated for another time period, which, again, can be predetermined (e.g., 1 to 10 seconds) or intelligently selected based on the above factors or other criteria. Accordingly, this feature enables the user to keep the conversation with the dialog system in a natural manner, which is much less time consuming and annoying, especially when the user needs to manually reactivate the speech acquiring mode or the dialog system itself.

System Architecture

Figure 2:
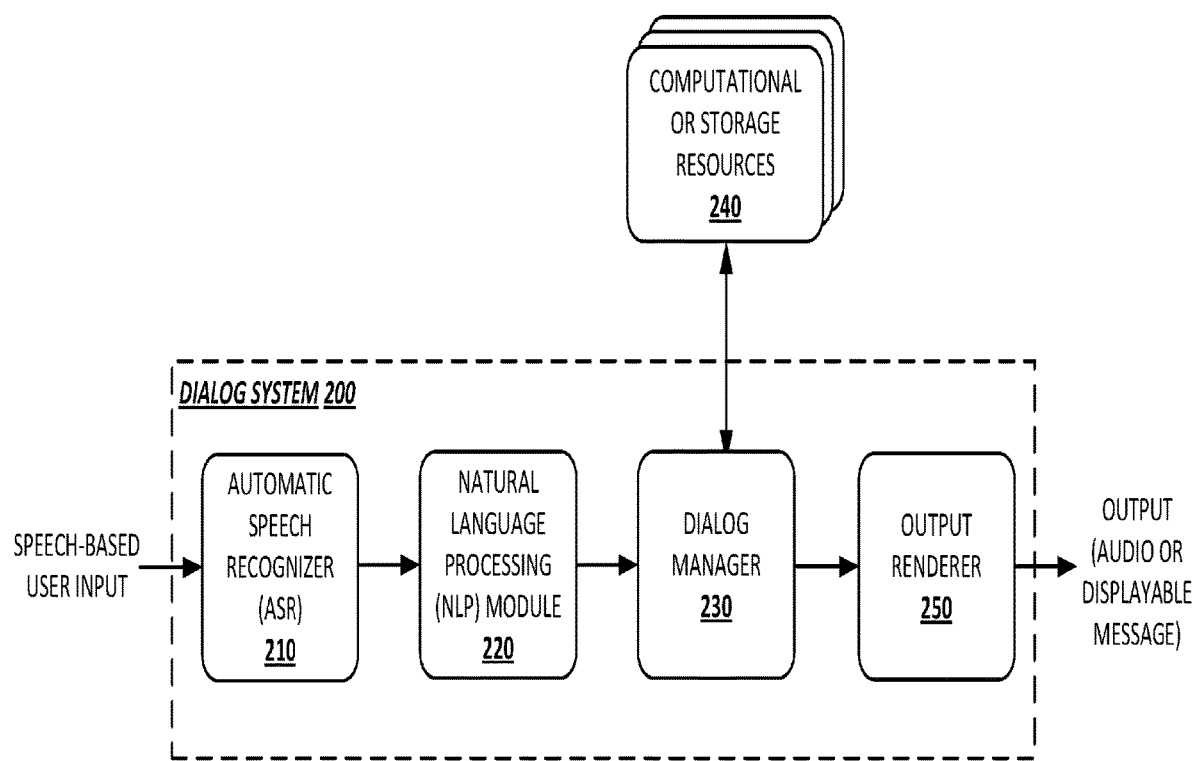
FIG. 2 shows a high level architecture of an exemplary spoken dialog system.

The above given user interaction process is further illustrated in FIG. 2, which shows a high level architecture of exemplary spoken dialog system 200, according to an example embodiment. It should be noted that every module of the dialog system 200 or associated architecture includes hardware components, software components, or a combination thereof. The dialog system 200 may be embedded or installed in the user device or server, or may be presented as a cloud computing module and/or a distributed computing module.

In the embodiment shown, the dialog system 200 includes an ASR 210 configured to receive and process speech-based user inputs into a sequence of parameter vectors. The ASR 210 further converts the sequence of parameter vectors into a recognized input (i.e., a textual input having one or more words, phrases, or sentences). The ASR 210 includes one or more speech recognizers such as a pattern-based speech recognizer, free-dictation recognizer, address book based recognizer, dynamically created recognizer, and so forth.

Further, the dialog system 200 includes a NLP module 220 for understanding spoken language input. Specifically, the NLP module 220 may disassemble and parse the recognized input to produce utterances, which are then analyzed utilizing, for example, morphological analysis, part-of-speech tagging, shallow parsing, and the like, and then map recognized input or its parts to meaning representations.

The dialog system 200 further includes a dialog manager 230, which coordinates the activity of all components, controls dialog flows, and communicates with external applications, devices, services or resources. The dialog manager 230 may play many roles, which include discourse analysis, knowledge database query, and system action prediction based on the discourse context. In some embodiments, the dialog manager 230 may contact one or more task managers (not shown) that may have knowledge of specific task domains. In some embodiments, the dialog manager 230 may communicate with various computing, logic, or storage resources 240, which may include, for example, a content storage, rules database, recommendation database, push notification database, electronic address book, email or text agents, dialog history database, disparate knowledge databases, map database, points of interest database, geographical location determiner, clock, wireless network detector, search engines, social networking websites, blogging websites, news feeds services, and many more. The dialog manager 230 may employ multiple disparate approaches to generate outputs in response to recognized inputs. Some approaches include the use of statistical analysis, machine-learning algorithms (e.g., neural networks), heuristic analysis, and so forth. The dialog manager 230 is one of the central components of dialog system 200. The major role of the dialog manager 230 is to select the correct system actions based on observed evidences and inferred dialog states from the results of NLP (e.g., dialog act, user goal, and discourse history). In addition, the dialog manager 230 should be able to handle errors when the user input has ASR and NLP errors caused by noises or unexpected inputs.

The dialog system 200 may further include an output renderer 250 for transforming the output of the dialog manager 230 into a form suitable for providing to the user. For example, the output renderer 250 may employ a text-to-speech engine or may contact a pre-recorded audio database to generate an audio message corresponding to the output of the dialog manager 230. In certain embodiments, the output renderer 250 may present the output of the dialog manager 230 as a text message, an image, or a video message for further displaying on a display screen of the user device.

Figure 3:
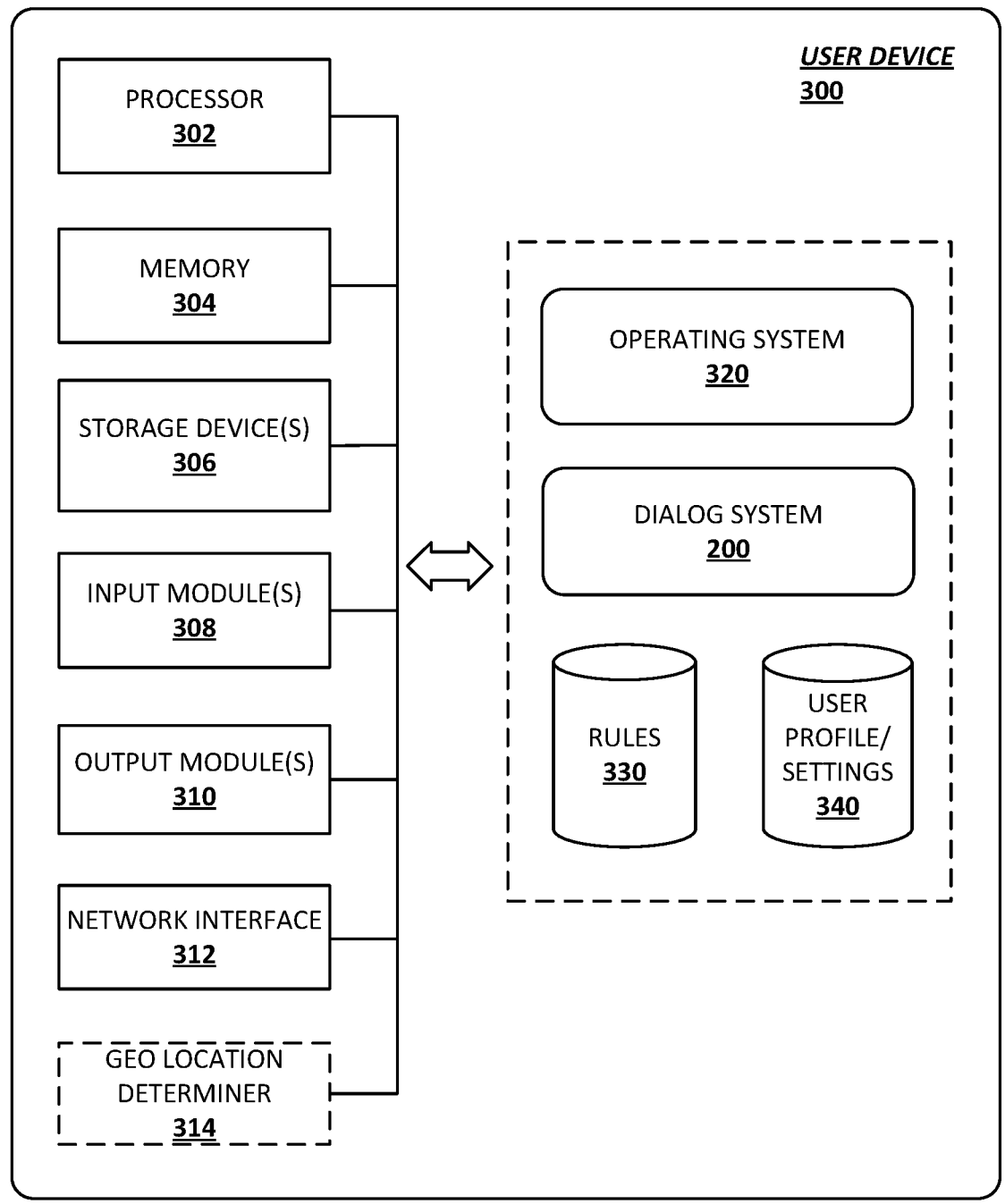
FIG. 3 shows a high-level block diagram illustrating an example user device suitable for implementing the methods described herein.

FIG. 3 is a high-level block diagram illustrating an example user device 300 suitable for implementing the methods described herein. It is worth mentioning that all components of the user device 300 may include logic elements, hardware components, software (firmware) components, virtual components, or a combination thereof. The user device 300 may include, be, or be an integral part of one or more of a variety of types of devices and systems such as a general-purpose computer, desktop computer, server, computer network, network service, and cloud computing service, among others. Further, all modules shown in FIG. 3 may be operatively coupled using any suitable wired, wireless, radio, electrical, or optical standards. As already outlined above, the user device 300 may refer to a smart phone, wireless telephone, and computer, such as a tablet computer, desktop computer, infotainment system, in-vehicle computing device, to name a few.

As shown in FIG. 3, the user device 300 includes the following hardware components: one or more processors 302, memory 304, one or more storage devices 306, one or more input modules 308, one or more output modules 310, network interface 312, and optional geo location determiner 314. The user device 300 also includes the following software or virtual components: an operating system 320, dialog system 200, rules database 330, and user profile/settings database 340. The dialog system 200 provides a human-centric interface for accessing and managing information as discussed herein.

The processor(s) 302 is(are), in some embodiments, configured to implement functionality and/or process instructions for execution within the user device 300. For example, the processor(s) 302 may process instructions stored in memory 304 and/or instructions stored on storage devices 306. Such instructions may include components of an operating system 320 and dialog system 200. The user device 300 may also include one or more additional components not shown in FIG. 3, such as a housing, power supply, and communication bus, among others. These elements are omitted not to burden the description of the present embodiments.

Memory 304, according to one example embodiment, is configured to store information within the user device 300 during operation. Memory 304, in some example embodiments, may refer to a non-transitory computer-readable storage medium or a computer-readable storage device. In some examples, memory 304 is a temporary memory, meaning that a primary purpose of memory 304 may not be long-term storage. Memory 304 may also refer to a volatile memory, meaning that memory 304 does not maintain stored contents when memory 304 is not receiving power. Examples of volatile memories include random access memories (RAM), dynamic random access memories (DRAM), static random access memories (SRAM), and other forms of volatile memories known in the art. In some examples, memory 304 is used to store program instructions for execution by the processors 302. Memory 304, in one example embodiment, is used by software (e.g., the operating system 320) or dialog system 200, executing on user device 300 to temporarily store information during program execution. One or more storage devices 306 can also include one or more transitory or non-transitory computer-readable storage media and/or computer-readable storage devices. In some embodiments, storage devices 306 may be configured to store greater amounts of information than memory 304. Storage devices 306 may further be configured for long-term storage of information. In some examples, the storage devices 306 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing FIG. 3, the user device 300 includes one or more input modules 308. The input modules 308 are configured to receive user inputs. Examples of input modules 308 include a microphone, keyboard, keypad, mouse, trackball, touchscreen, touchpad, or any other device capable of detecting an input from a user or other source in the form of speech, audio, or tactile actions, and relaying the input to the user device 300 or components thereof. The output modules 310, in some example embodiments, are configured to provide output to users through visual or auditory channels. Output modules 310 may include a video graphics adapter card, liquid crystal display (LCD) monitor, light emitting diode (LED) monitor, sound card, speaker, or any other device capable of generating output that may be intelligible to a user.

The user device 300, in certain example embodiments, includes network interface 312. The network interface 312 can be utilized to communicate with external devices, servers, and networked systems via one or more communications networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. The network interface 312 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as Universal Serial Bus (USB).

The user device 300 may further include a geo location determiner 314 for determining a current geographical location of the user device. The geo location determiner 314 may utilize a number of different methods for determining geographical location including, for example, receiving and processing signals of Global Positioning Systems (GPS), GLONASS satellite navigation systems, or the Galileo satellite navigation system; utilizing multilateration of radio signals between radio towers (base stations); or utilizing geolocation methods associated with Internet Protocol (IP) addresses, Media Access Control (MAC) addresses, Radio-Frequency Identification (RFID), or other technologies.

The operating system 320 may control one or more functionalities of user device 300 or components thereof. For example, the operating system 320 may interact with the dialog system 200, rules database 330, and user profile/settings database 340, and may further facilitate one or more interactions between elements 200, 330, 340 and one or more of processors 302, memory 304, storage devices 306, input modules 308, and output modules 310. As shown in FIG. 3, the operating system 320 may interact with or be otherwise coupled to the dialog system 200 and components thereof. In some embodiments, the dialog system 200 can be included into the operating system 320. Notably, the user device 300 and its components, such as the dialog system 200, may also interact with one or more remote storage or computing resources including, for example, web resources, web sites, social networking websites, blogging websites, news feeds, email servers, web calendars, event databases, ticket aggregators, map databases, points of interest databases, and so forth.

In certain embodiments, the rules database 330, which can be optional in many designs, includes one or more of the following: rules, program codes, instructions, parameters, specifications, and other data to enable the dialog system to operate in a designed way. The user profile/settings database 340, which can also be optional in many designs, includes user profiles, personalized settings, user preferences, user data, and so forth. In other words, the dialog system 200 may operate relying on instructions stored in the rules database 330 and/or user preferences set in the user profile/settings database 340.

Figure 4:
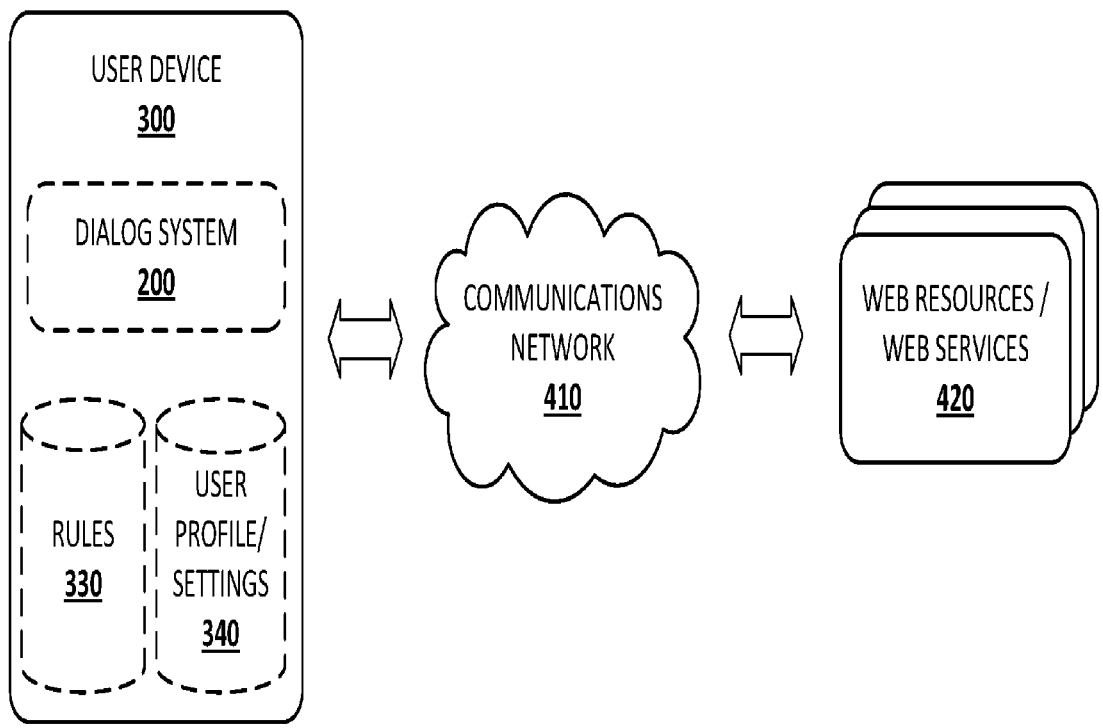
FIG. 4 shows a high-level block diagram of an example system environment suitable for practicing the present technologies.

FIG. 4 shows a high-level block diagram of an example system environment 400 suitable for practicing the present technologies. The system environment 400 includes a user device 300 having a dialog system 200 and databases 330, 340 installed therein. There is also provided a communications network 410 allowing the user device 300 to communicate with one or more web resources and/or web services 420.

In this example embodiment, the processing of user requests is performed solely using hardware and software/virtual components of the user device 300 itself. The user device 300 may, however, communicate with the web resources and/or web services 420 in order to obtain requested information or perform a requested action.

Figure 5:
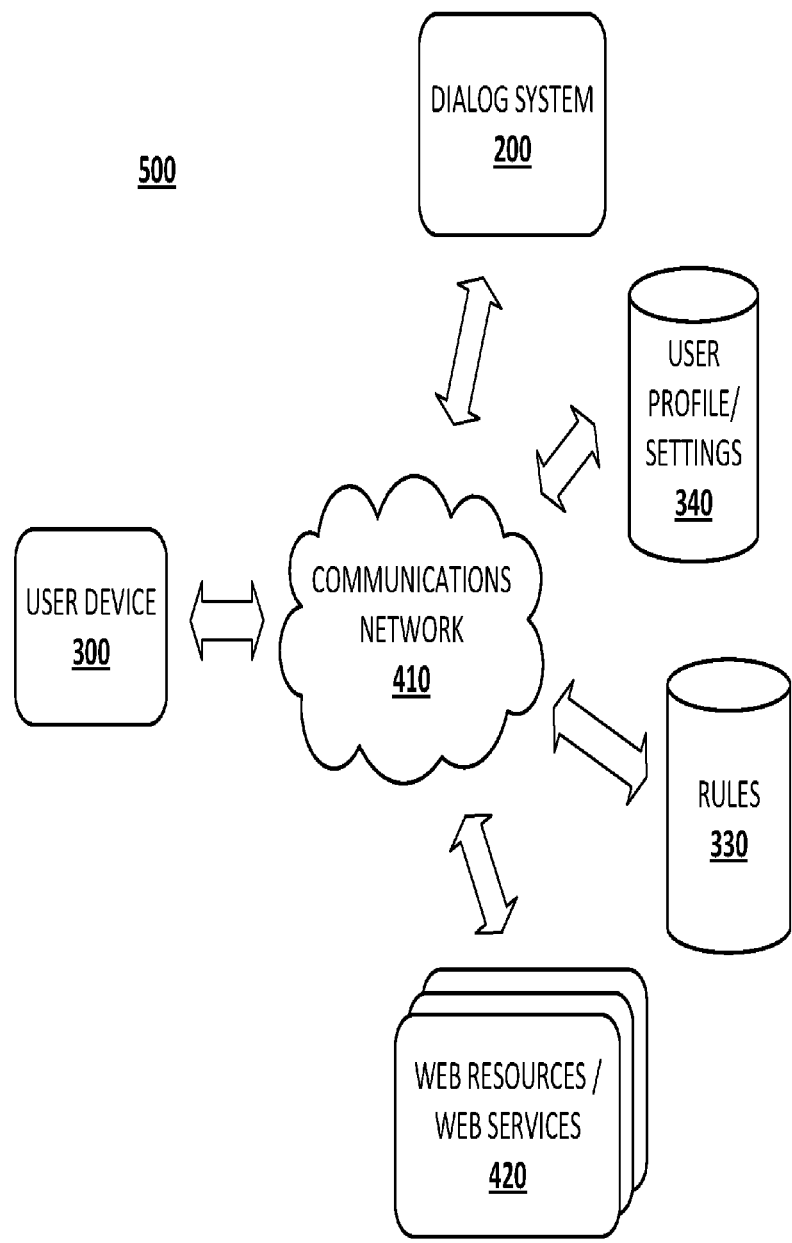
FIG. 5 shows a high-level block diagram of another example system environment suitable for practicing the present technologies.

FIG. 5 shows a high-level block diagram of another example system environment 500 suitable for practicing the present technologies. More specifically, this embodiment refers to a distributed system environment or cloud-based system environment, where a user device 300 serves a client, and the dialog system 200 and the databases 330, 340 are in a networked server(s).

In this example, the user device 300 is configured to receive or capture user audio inputs (e.g., via one or more microphones) or tactile based inputs and deliver them to the dialog system 200 via a communications network 410. Once the user input is processed and a response is generated, it is delivered from the dialog system 200 to the user device 300 via the communications network 410. Once the response is received, the user device 300 simply plays back or displays it.

The web resources and/or web services 420 shown in FIGS. 4, 5 refer one or more of the following: webpages, websites, Internet search engines, databases, data storage, data aggregators (e.g., ticket aggregators), file sharing websites, e-mail servers, e-mail services, instant messaging services, social networking websites, blogging websites, micro-blogging websites, news services, news Rich Site Summaries (RSS), map services, online banking services, online calendar services, online appointment scheduling services, location determining services, weather services, time services, Application Programming Interfaces (APIs), and so forth. Notably, the dialog system 200 and its components are configured to operatively communicate with these or similar web resources and/or web services 420 to exchange data depending on a particular application and user request. For example, the dialog system 200 may communicate with the at least one web resource and/or web service 420 so as to generate responses to user inputs (e.g., to retrieve/download weather information). In another example, the dialog system 200 may communicate with the at least one web resource and/or web service 420 so as to identify triggering events (e.g., identifying a new status of the user's friend via at least one social networking site). In yet another embodiment, the recommendation manager may communicate with the at least one web resource and/or web service 420 so as to generate one or more dialog recommendations for the user (e.g., communicating with a map service to identify points of interests located near a current location of the user or provide navigation).

Graphical User Interface

Figure 6:
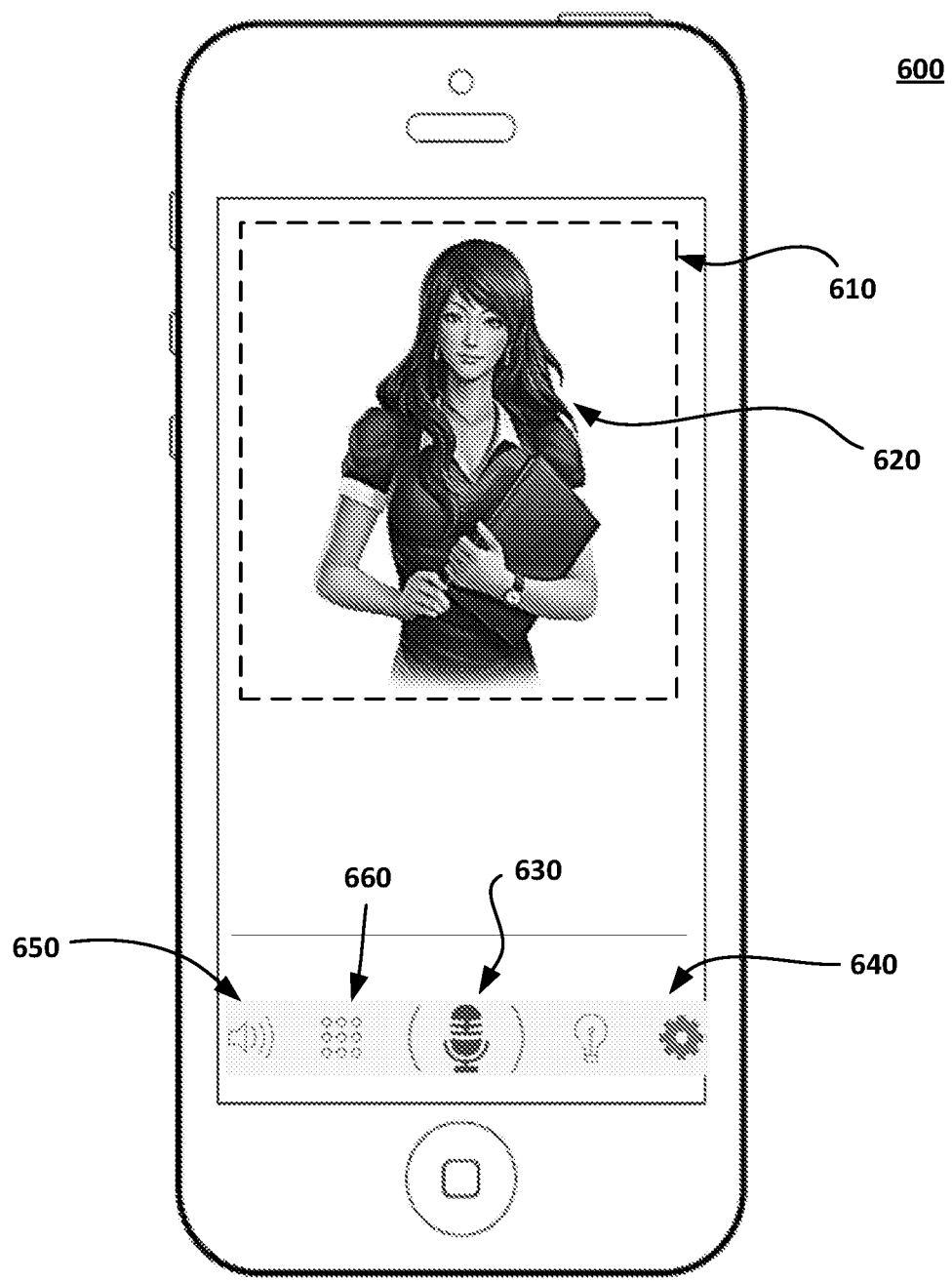
FIG. 6 shows a schematic diagram of a graphical user interface with chat features for an exemplary user device.

FIG. 6 illustrates a schematic diagram of a graphical user interface 600 with chat features for an exemplary user device 300 shown in the form of a wireless telephone with a touchscreen. It worth mentioning that the same or similar graphical user interface 600 may be provided for a desktop or laptop computer, tablet computer, or any other suitable device.

Generally, the user interface 600 is the first screen displayable when the user starts the operation of the dialog system 200. In the example embodiment shown, the user interface 600 includes a container 610 (may also refer to a window widget or output element) where an avatar 620 is displayed. Optionally, the user can select an avatar of his preference or construct it from disparate elements (e.g., select clothes, eyes, hair, etc.).

The user interface 600 also includes a number of actionable (clickable) buttons including a microphone button 630, a settings button 640, and a speaker button 650. The microphone button 630, when pressed by a user, manually activates a speech acquiring mode of a dialog system. In this mode, the user device 300 records user speech inputs or allows the user to make an input using a keypad. Typically, the mode is active as long as the user makes an input, and once the input is completed, the speech acquiring mode can be automatically or manually deactivated. After its deactivation, the dialog system 200 starts processing the recorded input to generate a corresponding answer. That said, if the user wants to make a request to the dialog system 200, he needs to press the microphone button 630, provide an input, and wait for a response.

In certain embodiments, a first press on the microphone button 630 activates the speech acquiring mode, while a secondary press on the microphone button 630 deactivates the speech acquiring mode and/or cancels just made user input. In some embodiments, there may be also provided a cancelation button (not shown) enabling the user to stop or cancel a current action/mode performed by the dialog system 200.

Figure 8:
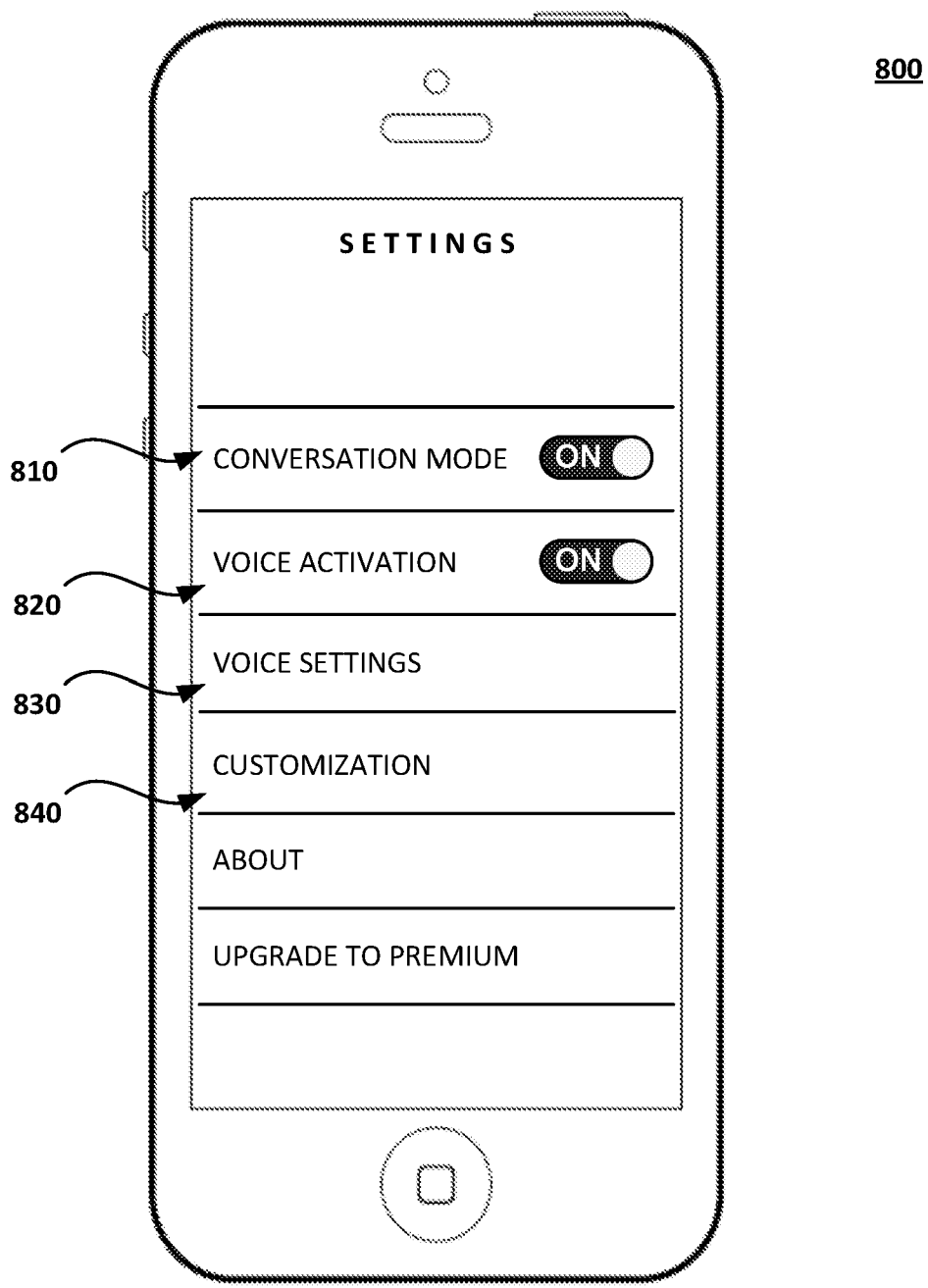
FIG. 8 shows a schematic diagram of yet another graphical user interface with settings features for an exemplary user device.

Still referencing FIG. 6, the setting button 640, when pressed by the user, brings a settings user interface 800 shown in FIG. 8. The setting interface enables the user to adjust parameters of the dialog system 200, establish or edit his profile, create or edit specific rules and criteria, and so forth. In one example, the user may activate or deactivate a conversation mode. Generally, the conversation mode enables the dialog system 200 to keep conversations with the user by automatically re-activating the speech acquiring mode in certain time instances.

Further, the speaker button 650 controls the method of delivering dialog system responses to the user. Namely, this button enables a user to select whether a responses are provided as audio messages through a speaker or as displayable messages only.

Notably, the graphical user interface 600 may include other containers, widgets, icons, or buttons such as a button to manually activate or deactivate the conversation mode. Moreover, in certain embodiments, the user may also activate or interact with the user interface 600 by actuating traditional buttons present on the user device (e.g., a "main menu" button 660 or a key pad). In yet other embodiments, the user may activate or interact with the user interface 600 by giving a gesture based command.

Figure 7:
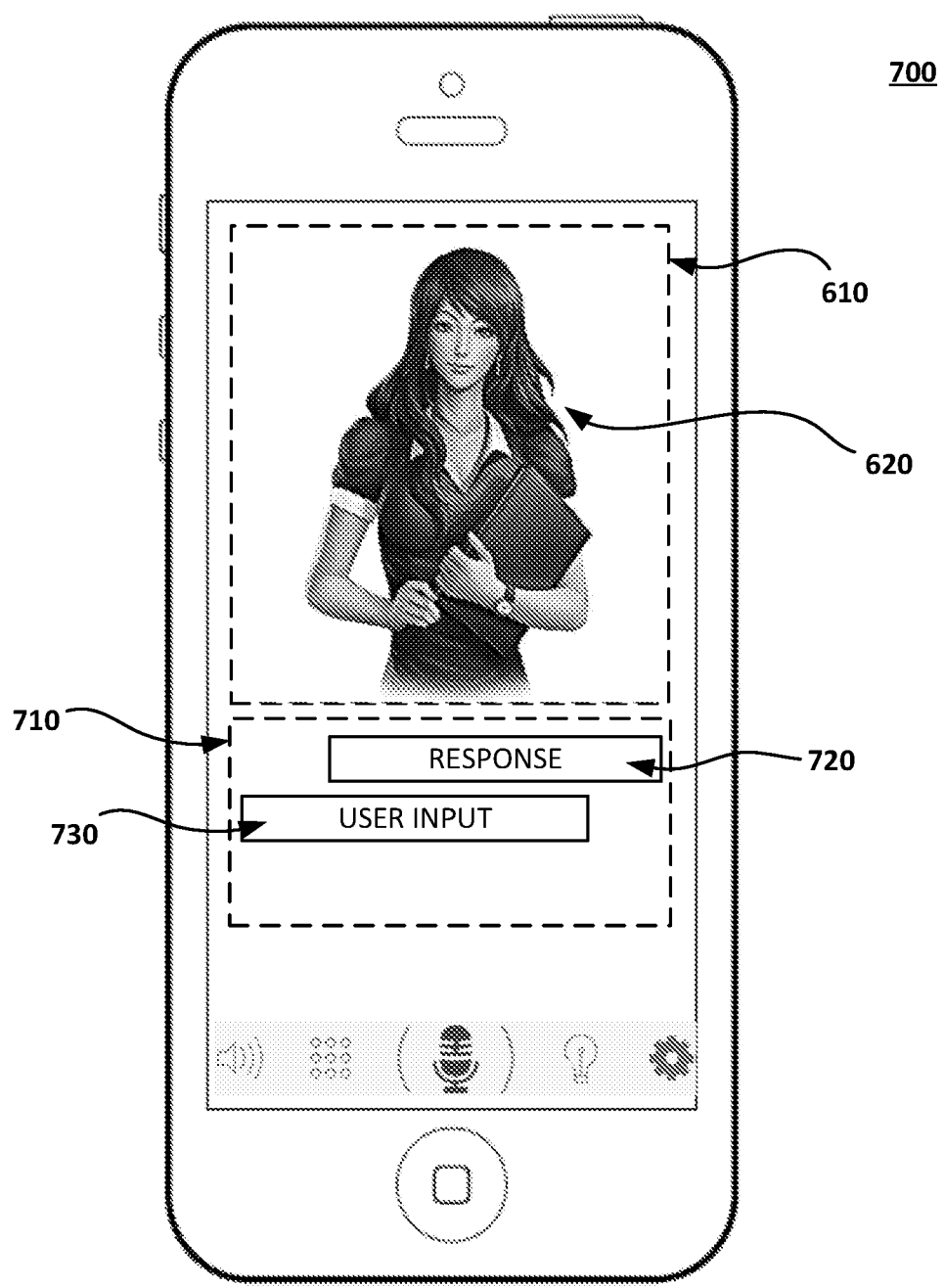
FIG. 7 shows a schematic diagram of another graphical user interface with chat features for an exemplary user device.

FIG. 7 illustrates a schematic diagram of another graphical user interface 700 with chat features for an exemplary user device 300 shown in the form of a wireless telephone with a touchscreen. Generally, the user interface 700 is a screen displayable to the user after the dialog system 200 processed at least one user input.

In particular, the user interface 700 includes the container 610 with the avatar 620, clickable buttons (i.e., the microphone button 630, settings button 640 and speaker button 650), and also a container 710. The container 710 is used for displaying messages (i.e., text, image, or video based messages) generated by the dialog system 200. As shown in FIG. 7, the container 710 may display a user input 730 in the form of a text message after it was input by the user using a keyboard or after it was spoken and recognized by the dialog system 200. Further, the container 710 may show a response 720 of the dialog system 200 to a particular user input such as the user input 730. Similarly, the response 720 can be in the text message. Notably, the container 710 may display multiple user inputs and multiple dialog system responses, one after another, to reflect a conversation of the user with the dialog system 200.

FIG. 8 illustrates a schematic diagram of yet another graphical user interface being a settings user interface 800 with settings features for an exemplary user device 300 shown in the form of a wireless telephone with a touchscreen. The settings user interface 800 enables the user to manage the operation of the dialog system, create and edit user profile and parameters/rules associated thereto, and activate/deactivate disparate features and modes.

In the example shown, there are the following control buttons or radio buttons: "Conversation Mode" radio button 810, "Voice Activation" radio button 820, "Voice Settings" clickable button 830, and "Customization" clickable button 840. More specifically, "Conversation Mode" radio button 810 enables the user to manually activate or deactivate the conversation mode. When this mode is activated, the dialog system keeps the dialog with the user by automatically re-activating the speech acquiring mode after a response is delivered to the user and when certain predetermined criteria are met. "Voice Activation" radio button 820 enables the user to activate or deactivate the mode of voice activation (i.e. "wake-up") of the dialog system. For example, the dialog system may be activated (i.e. "woken up") after the user says a phrase, such as 'Hay, Assistant!' "Voice Settings" clickable button 830 enables the user to set characteristics for presenting audio message (e.g., to select a voice). Finally, "Customization" clickable button 840 enables the user to customize his profile, specific rules or parameters of the dialog system, and so forth. Some or all of the settings can be stored in the user profile/settings database 340 for further reference by the dialog system 200.

Operation Methods

This section of the document provides multiple examples of operation methods. First, with reference to FIGS. 9 and 10, there are described generalized operation methods of dialog system 200, and further, with reference to FIGS. 11-15, there are provided more specific examples (i.e., conversation scenarios).

Figure 9:
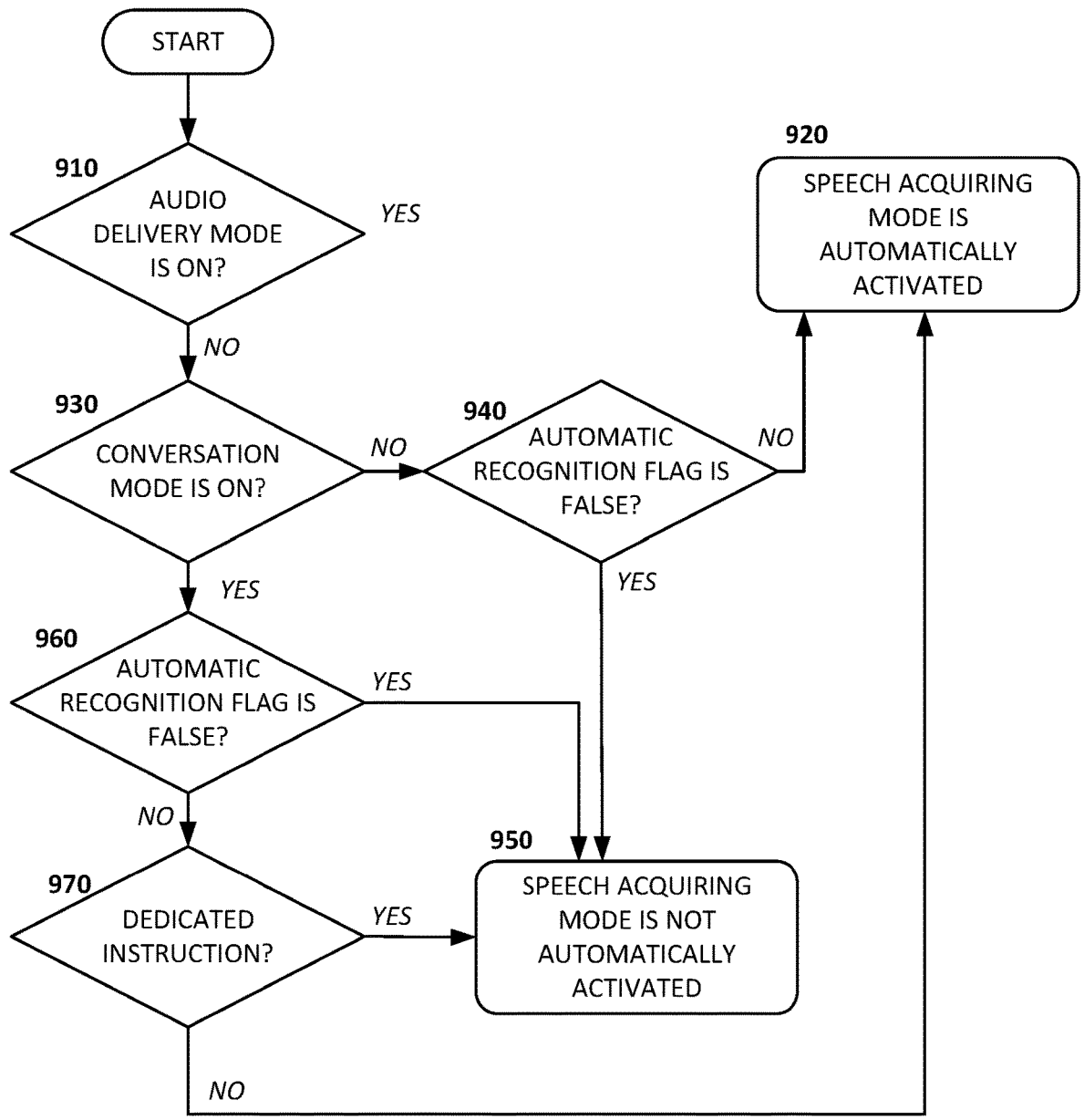
FIG. 9 shows a process flow diagram showing a method for activation of speech acquiring mode.

FIG. 9 is a process flow diagram showing a method 900 for activation of speech acquiring mode, according to an example embodiment. The method 900 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic refers to the dialog system 200 or its components. In other words, the method 900 can be performed by various components discussed above with reference to FIGS. 2-5. Notably, the below recited steps of method 900 may be implemented in an order different than described and shown in FIG. 9. Moreover, the method 900 may have additional steps not shown herein, but which can be evident for those skilled in the art from the present disclosure. The method 900 may also have fewer steps than outlined below and shown in FIG. 9.

As shown in the figure, the process commences at the decision block 910, when the dialog system 200 determines whether or not a voice conversation mode is activated. The step can be performed each time when the dialog system 200 is started or after the dialog system 200 just delivered a response to a user request. If it is determined that the voice activation mode is not activated by the user, the method 900 proceeds to the step 920, which instructs the dialog system 200 that a speech acquiring mode shall not be automatically activated after a response is delivered to the user. Otherwise, if it is determined that the voice activation mode is already activated by the user in settings, the method 900 proceeds to the step 930, which instructs the dialog system 200 to determine whether or not the conversation mode is activated.

If it is determined that the conversation mode is not activated by the user, the method 900 proceeds to the step 940, which instructs the dialog system 200 to determine whether or not a previously delivered response includes metadata with an "automatic recognition" flag with a "true" value. If it is determined that the "automatic recognition" flag does not have a "true" value (i.e., it has "false" value), the method 900 proceeds to the step 920, which instructs the dialog system 200 that the speech acquiring mode shall not be automatically activated after a response is delivered to the user. Otherwise, if it is determined that the "automatic recognition" flag has the "true" value, the method 900 proceeds to the step 950, which instructs the dialog system 200 that the speech acquiring mode shall be automatically re-activated after a response is delivered to the user.

If in the step 930 it is determined that the conversation mode was activated by the user, the method 900 proceeds to the step 960, which instructs the dialog system 200 to determine whether or not a previously delivered response includes metadata with a "automatic recognition" flag having a "false" value. If it is determined that the "automatic recognition" flag in the metadata indeed has the "false" value, the method 900 proceeds to the step 950, which instructs the dialog system 200 that the speech acquiring mode shall not be automatically activated after a response is delivered to the user. Otherwise, if it is determined that the "automatic recognition" flag does not have the "false" value (i.e., it has "true" value), the method 900 proceeds to the step 970, which instructs the dialog system 200 to determine whether or not a previously delivered response has a suppression instruction (for example, it is determined if a previously delivered response includes a dedicated instruction to suppress the speech acquiring mode). Accordingly, if it is determined that a previously delivered response included a suppression instruction, the method 900 proceeds to the step 950, which instructs the dialog system 200 that the speech acquiring mode shall not be automatically activated after a response is delivered to the user. Otherwise, if it is determined that a previously delivered response did not include a suppression instruction, the method 900 proceeds to the step 920, which instructs the dialog system 200 that the speech acquiring mode shall be automatically re-activated after a response is delivered to the user.

Figure 10:
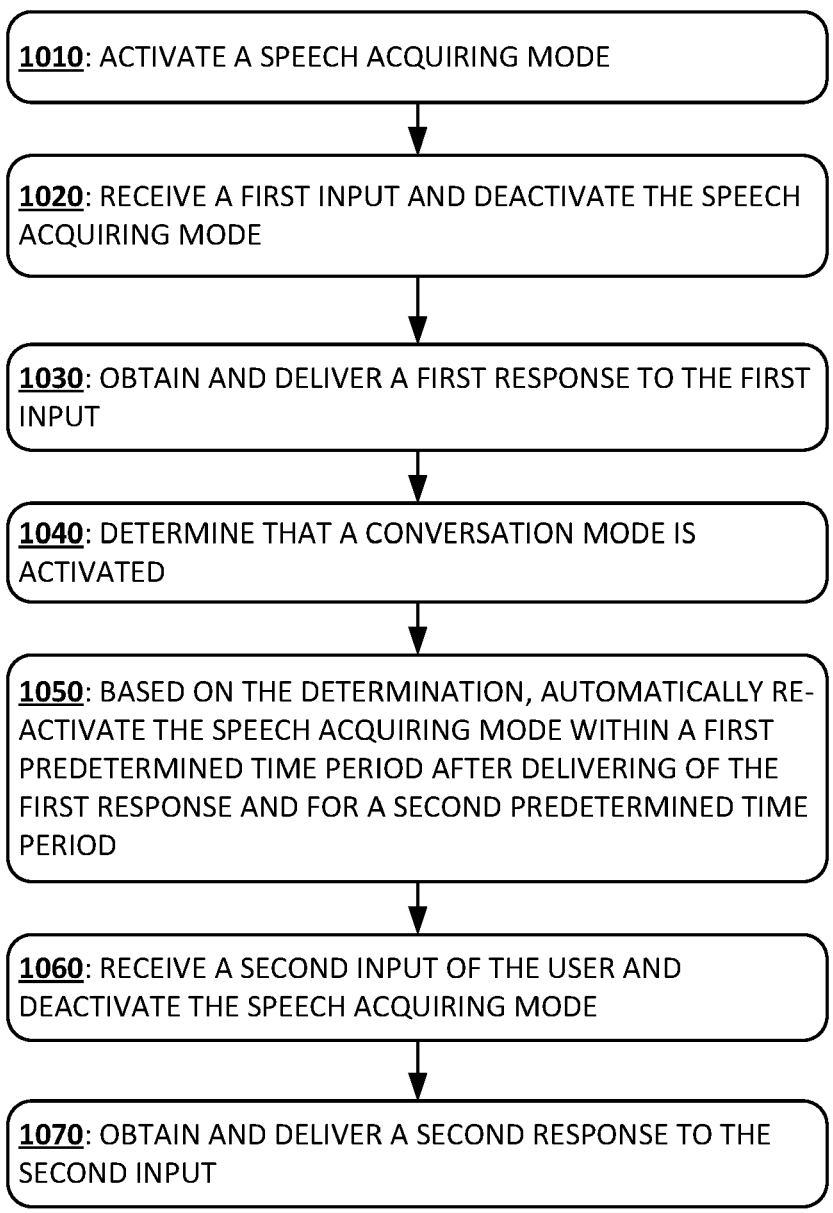
FIG. 10 shows a process flow diagram showing a method for dialog system operation.

FIG. 10 is a process flow diagram showing a method 1000 for operation of a dialog system according to an example embodiment. The method 1000 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic refers to the dialog system 200 or its components. In other words, the method 1000 can be performed by various components discussed above with reference to FIGS. 2-5. It should be also appreciated that the method 1000 is just one example operation of the dialog system 200. In addition, the below recited steps of method 1000 may be implemented in an order different than described and shown in FIG. 10. Moreover, the method 1000 may have additional steps not shown herein, but which can be evident for those skilled in the art from the present disclosure. The method 1000 may also have fewer steps than outlined below and shown in FIG. 10.

The method 1000 starts at operation 1010 with activating a speech acquiring mode of the dialog system 200. This can be done manually by pressing the microphone button 630 or when the dialog system 200 is started, e.g. by the a user tap or by an activation word or an activation phrase, a user opening push message, a reminder, a notification, and so forth. In an example embodiment, a 'listed upon startup' option may be active for a microphone, according to which the microphone may be activated upon the start ('wake up') of the dialog system 200. Once the speech acquiring mode is activated, the user is invited to provide an oral request. Accordingly, at operation 1020, the dialog system 200 receives a first input of the user and the speech acquiring mode is deactivated. In some embodiments, while the speech acquiring mode is active, the dialog system 200 or the user device 300 records the user input, but after the speech acquiring mode is deactivated the recorded user input is processed by the dialog system 200.

Still referencing FIG. 10, at operation 1030, the dialog system 200 processes the first input, and then obtains and delivers a first response to the first input. In one example embodiment, the delivery of the first response can include presenting an audio message to a user via a speaker or headphones of the user device 300. In another example embodiment, the delivery of the first response can include presenting a displayable message on a display of the user device 300, and the message can include text, image, video, or any other displayable content. In yet more embodiments, the response can be delivered as both an audio message and displayable message.

Further, at operation 1040, the dialog system 200 determines that a conversation mode is activated. As mentioned above, the conversation mode can be enabled by the user in the settings user interface 800. At operation 1050, based on the determination, the dialog system 200 automatically re-activates the speech acquiring mode within a first predetermined time period after delivering of the first response to the user. In an example embodiment, the dialog system 200 may determine whether the mode (when the dialog system responses are presented in the form of audio messages in addition to displayable messages) is activated ('mute off' mode) or deactivated ('mute on' mode). In the 'mute off' mode, the activation of the speech acquiring mode is done immediately after the dialog system 200 finishes speaking (unless there is an instruction to do otherwise). In the 'mute on' mode, a plurality of predetermined rules may be used to determine how much time is needed for the user to read/understand the first response (e.g., if graphics are presented in the first response).

In one example embodiment, the first predetermined time period is fixed. For example, the first predetermined time period may be anywhere between 0.1 second to 20 seconds, but more preferably it is between 1 second and 10 seconds. In one instance, it can be 2 seconds, but in another instance it can be 5 seconds depending on other factors.

In another embodiment, the first predetermined time period is dynamically selected or determined based on predetermined criteria or rules. For example, the first predetermined time period may depend on a type of first user input. In another example, the first predetermined time period may depend on a type of first response delivered to the user (e.g., when a response relates to reading of an email, the first predetermined time period may be longer in contrast than when a response relates to reading of current weather parameters). In yet another example, the first predetermined time period may depend on a length of the first response delivered to the user. The length may be determined by a number of words or letters in the response, although other complexity criteria can be employed. For example, if the response is less than 10 words long, the first predetermined time period can be just 1 second; if the response is between 10 and 20 words, the first predetermined time period is 3 seconds; if the response is between 20 and 30 words, the first predetermined time period is 5 seconds, and so forth. It should be clear that the first predetermined time period may depend on a number of factors and predetermined rules pre-selected for certain conversation scenarios. In yet more embodiments, the first predetermined time period can be set by metadata associated with the response.

Notably, the speech acquiring mode is re-activated for a second predetermined time period, when the dialog system 200 awaits and records the next user input. Similarly to above, the second predetermined time period may depend on a number of factors. For example, in one example embodiment, the second predetermined time period is fixed. It can be anywhere between 1 second to 20 seconds, but more preferably it is between 1 second and 10 seconds. In some examples, the second predetermined time period can be set by metadata associated with the response. In yet another example embodiment, the second predetermined time period is dynamically selected or determined based on disparate predetermined criteria or rules. For example, the second predetermined time period may depend on a type of first user input. In another example, the second predetermined time period may depend on a type of first response delivered to the user. In another example, the second predetermined time period may depend on a length of the first response delivered to the user. The length may be determined by a number of words or letters in the response, although other complexity criteria can be employed. It should be clear that the second predetermined time period may depend on a number of factors and predetermined rules pre-selected for certain conversation scenarios.

Still referencing to FIG. 10, at operation 1060, the dialog system 200 receives a second input of the user and deactivates the speech acquiring mode (which was activated at the operation 1040). Similarly to above, at operation 1070, the dialog system 200 obtains and delivers a second response associated with the second input of the user.

Accordingly, the operations of method 1000 may be cyclically repeated over and over again so that the user may experience a natural language conversation with the dialog system 200. The use of first and second predetermined time periods allows the dialog system 200 to intelligently expect when a next user request will be made to provide the most natural dialog interaction experience to the user, and without excessive consumption of computational and power resources.

As already outlined above, in certain embodiments, the response of the dialog system 200 may include metadata, which may include additional instructions, for example, in the form of the automatic recognition flag. This flag can be used to initiate recognition if the flag true or forcefully suppress the re-activation of the speech acquiring mode after the response is delivered to the user. In other embodiments, the metadata may set the first and/or second predetermined time periods equal to zero. In this case, the user will not be able to provide an input without manual reactivation of the speech acquiring mode.

In some additional embodiments, metadata may also include additional instructions setting emotional characteristics to a corresponding response to be delivered to the user. The emotional characteristics may relate to the appearance of the avatar 620 and/or tone, voice, intonation, volume or other parameters of the audio message associated with the dialog system response.

In other embodiments, metadata may also include instructions to certain hardware or software resources of the user device 300. For example, there may be instructions to acquire current geographical location of the user, store or retrieve certain data to the user profile, and so forth.

Conversation Scenarios

Scenario 1

This exemplary conversation scenario illustrates automatic activation of the speech acquiring mode after a response is delivered to a user. In this scenario, the voice activation mode is activated and a conversation mode is also activated (e.g., through the settings user interface 800).

Figure 11:
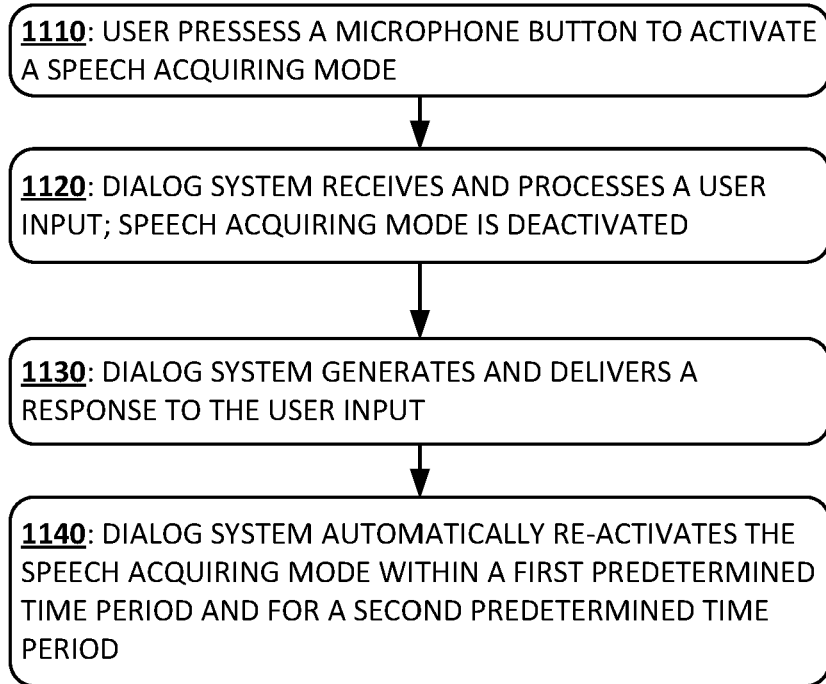
FIG. 11 shows a process flow diagram showing a first conversation scenario.

FIG. 11 is a process flow diagram showing a first conversation scenario method 1100 according to an example embodiment. Similar to above, the method 1100 can be performed by one or more components of the dialog system 200 and/or the user device 300. Notably, the method 1100 may have additional steps or may have fewer steps than shown, and the order of the steps may differ from that shown.

At step 1110, a user presses the microphone button 630 to activate the speech acquiring mode. At step 1120, the user provides an input and the dialog system 200 acquires, recognizes, and processes the user input. At step 1130, the dialog system 200 generates and delivers a response to the user. At step 1140, the dialog system 200 automatically re-activates the speech acquiring mode within a first predetermined time period and for a second predetermined time period.

Scenario 2

This exemplary conversation scenario illustrates temporary suppressing of the conversation mode upon input using a keyboard. In this scenario, the voice activation mode is activated and a conversation mode is also activated (e.g., through the settings user interface 800).

Figure 12:
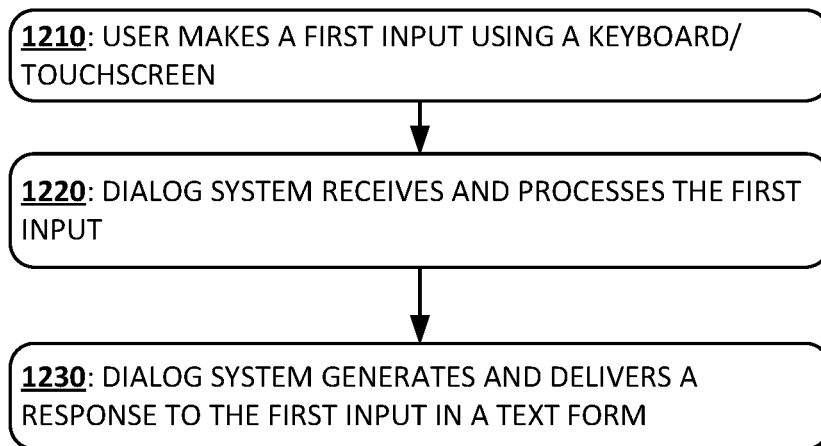
FIG. 12 shows a process flow diagram showing a second conversation scenario.

FIG. 12 is a process flow diagram showing a second conversation scenario method 1200 according to an example embodiment. Similar to above, the method 1200 can be performed by one or more components of the dialog system 200 and/or the user device 300. Notably, the method 1200 may have additional steps or may have fewer steps than shown, and the order of the steps may differ from that shown.

At step 1210, a user makes a first input to the dialog system 200 using a keyboard or touchscreen. At step 1220, the dialog system 200 acquires and processes the first input. At step 1230, the dialog system 200 generates and delivers a response to the first input in the form of an audio and/or text message. Further, the user may make a second input. If the second input is in a text form (e.g., when the user uses the keyboard), the dialog system 200 does not activate the speech acquiring mode. Otherwise, if the second input is in a speech form, the dialog system 200 activates the speech acquiring mode and further processing is performed in accordance with Scenario 1.

Scenario 3

This exemplary conversation scenario illustrates suppression of the speech acquiring mode based on a dialog system response. In this scenario, the voice activation mode is activated and a conversation mode is also activated (e.g., through the settings user interface 800).

Figure 13:
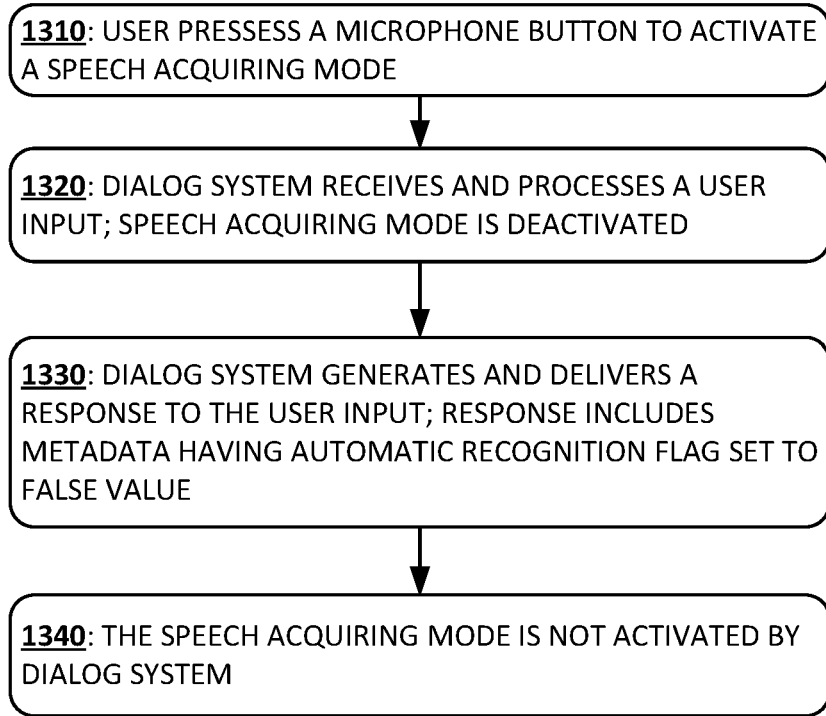
FIG. 13 shows a process flow diagram showing a third conversation scenario.

FIG. 13 is a process flow diagram showing a third conversation scenario method 1300 according to an example embodiment. Similar to above, the method 1300 can be performed by one or more components of the dialog system 200 and/or the user device 300. Notably, the method 1300 may have additional steps or may have fewer steps than shown, and the order of the steps may differ from that shown.

At step 1310, a user presses the microphone button 630 to activate the speech acquiring mode. At step 1320, the user provides an input and the dialog system 200 acquires, recognizes, and processes the user input. At step 1330, the dialog system 200 generates and delivers a response to the user. The response includes metadata having the "automatic recognition" flag with the "false" value. At step 1340, the dialog system 200 does not automatically re-activate the speech acquiring mode as prescribed by the metadata.

Scenario 4

This exemplary conversation scenario illustrates automatic activation of the speech acquiring mode based on a dialog system response. In this scenario, the voice activation mode is activated and a conversation mode is not activated (e.g., through the settings user interface 800).

Figure 14:
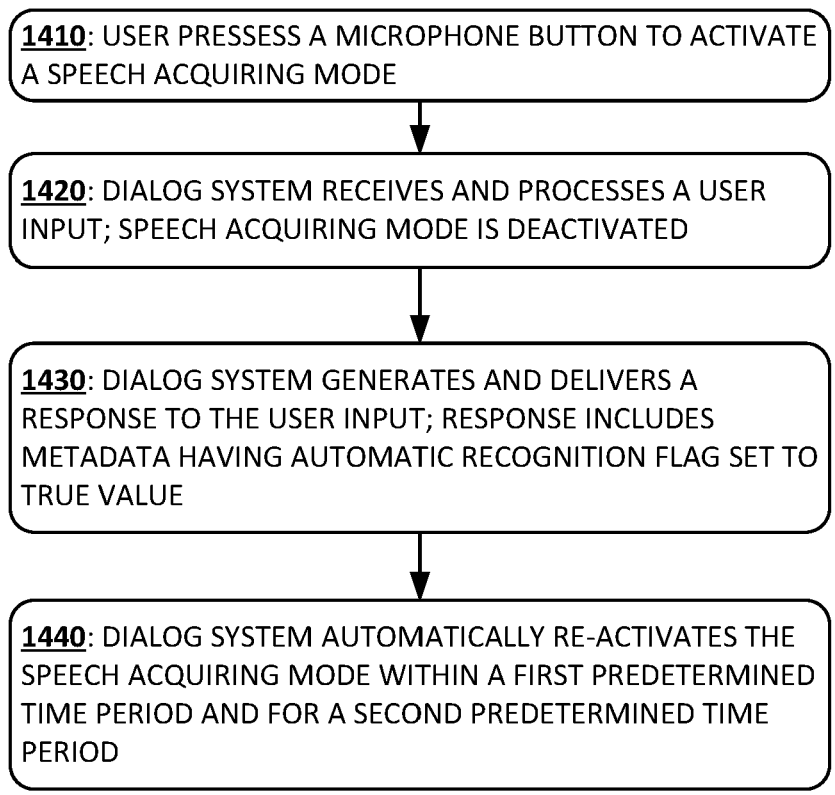
FIG. 14 shows a process flow diagram showing a fourth conversation scenario.

FIG. 14 is a process flow diagram showing a fourth conversation scenario method 1400 according to an example embodiment. Similar to above, the method 1400 can be performed by one or more components of the dialog system 200 and/or the user device 300. Notably, the method 1400 may have additional steps or may have fewer steps than shown, and the order of the steps may differ from that shown.

At step 1410, a user presses the microphone button 630 to activate the speech acquiring mode. At step 1420, the user provides an input and the dialog system 200 acquires, recognizes, and processes the user input. At step 1430, the dialog system 200 generates and delivers a response to the user. The response includes metadata having the "automatic recognition" flag with the "true" value. At step 1440, the dialog system 200 automatically re-activates the speech acquiring mode within a first predetermined time period and for a second predetermined time period.

Scenario 5

This exemplary conversation scenario illustrates operation of the dialog system when the speech acquiring mode is not activated due to suppression based on a suppression instruction. Accordingly, in this scenario, the voice activation mode is not activated and a conversation mode is also not activated (e.g., through the settings user interface 800).

Figure 15:
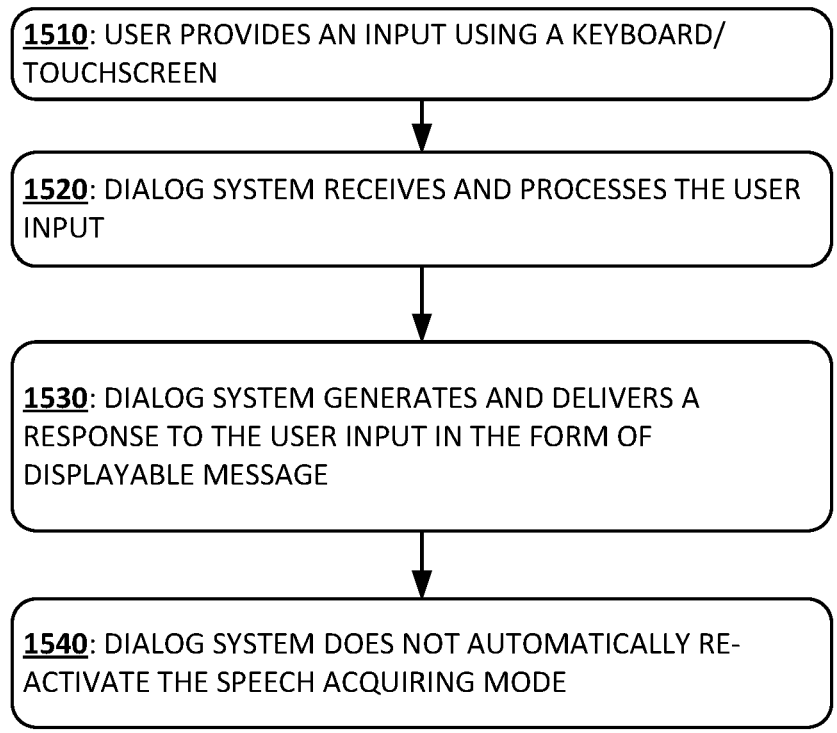
FIG. 15 shows a process flow diagram showing a fifth conversation scenario.

FIG. 15 is a process flow diagram showing a fifth conversation scenario method 1500, according to an example embodiment. Similar to above, the method 1500 can be performed by one or more components of the dialog system 200 and/or the user device 300. Notably, the method 1500 may have additional steps or may have fewer steps than shown, and the order of the steps may differ from that shown.

At step 1510, a user provides an input using a keyboard or touchscreen. At step 1520, the dialog system 200 acquires and processes the user input. At step 1530, the dialog system 200 generates and delivers a response to the user in the form of displayable message only, for example, opening a webpage, launching an application, initiating media playback, and so forth. At step 1540, the dialog system 200 does not automatically re-activate the speech acquiring mode.

Thus, the dialog system and method of its operation have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for operating a dialog system, the method implemented by one or more processors and comprising:
   providing, at a graphical interface associated with the dialog system, an actionable graphical button that is selectable through user interface input to activate or deactivate a conversation mode of the dialog system;
   activating the conversation mode of the dialog system in response to a selection of the provided actionable graphical button;
   after activating the conversation mode of the dialog system:
   activating a speech acquiring mode of the dialog system in response to a user speaking an activation phrase;
   receiving, via the speech acquiring mode after activating the speech acquiring mode, a first spoken input of a user;
   deactivating, after receiving the first spoken input of the user, the speech acquiring mode;
   obtaining a response associated with the first spoken input;
   delivering the response in response to receiving the first spoken input;
   selecting, based on one or more properties of the response, a time period for the speech acquiring mode to last when the speech acquiring mode is automatically reactivated responsive to the first spoken input;
   determining, in response to the conversation mode being activated, to automatically re-activate the speech acquiring mode responsive to the first spoken input;
   automatically re-activating the speech acquiring mode responsive to the first spoken input and in response to determining to automatically re-activate the speech acquiring mode,
      wherein automatically re-activating the speech acquiring mode comprises causing the speech acquiring mode to last for the selected time period.

2. The method of claim 1, wherein the one or more properties of the response include a length of the response and wherein selecting, based on one or more properties of the response, the time period for the speech acquiring mode to last when the speech acquiring mode is automatically reactivated responsive to the first spoken input, comprises:
   selecting the time period based on the length of the response.

3. The method of claim 1, wherein the one or more properties of the response include a type of the response and wherein selecting, based on one or more properties of the response, the time period for the speech acquiring mode to last when the speech acquiring mode is automatically reactivated responsive to the first spoken input, comprises:
   selecting the time period based on the type of the response.

4. The method of claim 1, wherein obtaining the response associated with the first spoken input comprises:
   processing the first spoken input, using an automatic speech recognizer, to generate a recognized input; and
   generating the response based on the recognized input.

5. The method of claim 4, wherein generating the response based on the recognized input comprises:
   retrieving text based on the recognized input;
   transforming the text into a machine-generated audio signal; and
   using the machine-generated audio signal as the response.

6. The method of claim 5, wherein automatically re-activating the speech acquiring mode occurs immediately after the machine-generated audio signal has been provided as output to the user.

7. A user device, the user device comprising:
   instructions stored in memory,
   one or more processors executing the stored instructions to cause the one or more processors to:
   activate a speech acquiring mode in response to a user speaking an activation phrase;

receive, via the speech acquiring mode after activating the speech acquiring mode, a first spoken input of a user;
deactivate, after receiving the first spoken input of the user, the speech acquiring mode;
obtain, in response to the first spoken input:
   a response that includes content to be rendered responsive to the first spoken input, and
   metadata associated with the response, wherein the metadata dictates that the speech acquiring mode is to be automatically reactivated after rendering of the content of the response;
render the content in response to receiving the response;
determine, in response to the metadata dictating that the speech acquiring mode is to be automatically reactivated after rendering of the content of the response, to automatically re-activate the speech acquiring mode after rendering of the content of the response; and
automatically re-activate the speech acquiring mode after rendering of the content of the response in response to determining to automatically re-activate the speech acquiring mode after delivery of the response.

8. The user device of claim 7,
wherein the metadata further dictates a time period for the speech acquiring mode to last when the speech acquiring mode is automatically reactivated after rendering of the content of the response; and
wherein in automatically re-activating the speech acquiring mode after rendering of the content of the response, one or more of the processors are to re-activate the speech acquiring mode for the time period in response to the metadata dictating the time period for the speech acquiring mode to last when the speech acquiring mode is automatically reactivated after rendering of the content of the response.

9. The user device of claim 7, wherein the user device further comprises a speaker and wherein the content is an audio message and is rendered via the speaker.

10. The user device of claim 7, wherein in obtaining the response one or more of the processors are to obtain the response via a communication network and from a dialog system.

11. The user device of claim 7, wherein the metadata, that dictates that the speech acquiring mode is to be automatically reactivated after rendering of the content of the response, comprises a flag with a true value.

12. The user device of claim 7, wherein the user device further comprises a speaker, wherein the content is an audio message and is rendered via the speaker, wherein the metadata further dictates one or more parameters of the audio message, and wherein in rendering the audio message one or more of the processors are to render the audio message with the one or more parameters.

13. The user device of claim 12, wherein the one or more parameters include a volume of the response.

14. The user device of claim 7, wherein the response includes the metadata.

* * * * *